United States Patent [19]
Tabe

[11] Patent Number: 5,909,931
[45] Date of Patent: Jun. 8, 1999

[54] BICYCLE HUB

[75] Inventor: Koshi Tabe, Sakai, Japan

[73] Assignee: Shimano, Inc., Osaka, Japan

[21] Appl. No.: 08/881,173

[22] Filed: Jun. 23, 1997

Related U.S. Application Data

[63] Continuation-in-part of application No. 08/759,941, Dec. 3, 1996.

[30] Foreign Application Priority Data

Feb. 20, 1996 [JP] Japan ........................................ 8-56976

[51] Int. Cl.⁶ ...................................................... B60B 27/02
[52] U.S. Cl. ............................................................ 301/110.5
[58] Field of Search ............................. 301/110.5, 110.6, 301/111, 124.2

[56] References Cited

U.S. PATENT DOCUMENTS

| | | | |
|---|---|---|---|
| 1,143,261 | 6/1915 | Ellett | 301/110.5 |
| 2,280,936 | 4/1942 | Swanson | 301/110.5 |
| 4,344,659 | 8/1982 | Shimano | 308/187.1 |
| 4,763,957 | 8/1988 | Poehlmann et al. | 301/110.5 |
| 4,880,280 | 11/1989 | Panzica et al. | 301/110.5 |
| 4,930,844 | 6/1990 | Giroux | 301/110.5 |

FOREIGN PATENT DOCUMENTS

| | | |
|---|---|---|
| 856601 | 7/1940 | France . |
| 2340830 | 9/1977 | France . |
| 9010815.9 | 11/1990 | Germany . |
| 9207715.3 | 10/1992 | Germany . |
| 9419357.6 | 3/1995 | Germany . |
| 2-155803 | 6/1990 | Japan . |
| WO 97/15461 | 5/1997 | WIPO . |

*Primary Examiner*—Russell D. Stormer
*Attorney, Agent, or Firm*—James A. Deland

[57] ABSTRACT

A bicycle hub includes a hub axle, a spacer disposed over an outer periphery of the hub axle, a hub shell, and a bearing disposed between the spacer and the hub shell for rotatably supporting the hub shell on the hub axle. The bearing is of the type including an inner ring, an outer ring, and a plurality of rolling members disposed between the inner ring and the outer ring. To prevent dirt, sand and other foreign matter from entering the bearings, a seal is disposed between the spacer and the hub shell laterally outwardly of the bearing.

46 Claims, 6 Drawing Sheets

BICYCLE HUB

CROSS-REFERENCE TO RELATED APPLICATIONS

This application is a continuation-in-part of application number 08/759,941, filed Dec. 3, 1996.

BACKGROUND OF THE INVENTION

The present invention is directed to a bicycle hub and, more particularly, to a bicycle hub which is specially suited for use in harsh environments under demanding conditions.

A bicycle hub, such as a front wheel hub, must be capable of withstanding static and dynamic loads while permitting the wheels to rotate smoothly and easily. Some bicycles that are subjected to rough and rapid maneuvers, such as mountain bikes, are equipped with shock absorbers in the front fork. Shock absorbers serve to cushion the impact that is transferred from the road surface to the bicycle body via the wheels when the bicycle is traveling, as well as to increase road contact with the wheels, improve steering control, and the like. Hubs in general need to have high rigidity, but front fork hubs that are provided with shock absorbers need even more rigidity because poor rigidity leads to loss of control in steering.

Front wheel hubs that are primarily used in off-road riding are subject to severe wear due to the entry of dirt, sand, and other foreign matter into sliding members. For this reason, front wheel hubs that incorporate sealed bearings equipped with outer rings, inner rings and rolling members are widely known. In conventional hubs, however, dirt, sand, and other foreign matter get caught between the inner ring and the hub axle when changing hubs outdoors because the hub axle is inserted directly into the inner ring of the bearing. The presence of foreign matter leads to wear in the inner ring of the bearing and in the hub axle, thus damaging the precise alignment required in the hub. Consequently, the desired rigidity of the hub is lost, and the service life of the hub is shortened.

Japanese Laid-Open Patent Application 2-155803 discloses a motorcycle rear wheel apparatus which is provided with a center spacer on the outer periphery of an axle shaft for the purpose of preventing dislocation of hub members. The inner ring of the bearings of this motorcycle rear wheel apparatus are not marred by the axle shaft because the axle shaft is supported by the inner ring of the bearings via the center spacer. However, this design allows foreign matter to easily enter the bearings directly from the outside. If this design is used under harsh conditions, such as those to which mountain bikes are subjected, foreign matter will enter the bearings.

SUMMARY OF THE INVENTION

The present invention is directed to a bicycle hub which prevents wear on the inner bearing rings and which also prevents dirt, sand and other foreign matter from entering the bearings. In one embodiment of the present invention, a bicycle hub includes a hub axle, a spacer disposed over an outer periphery of the hub axle, a hub shell, and a bearing disposed between the spacer and the hub shell for rotatably supporting the hub shell on the hub axle. The bearing is of the type including an inner ring, an outer ring, and a plurality of rolling members disposed between the inner ring and the outer ring. By supporting the bearing with a spacer rather than directly on the axle, wear on the inner bearing ring is eliminated.

To prevent dirt, sand and other foreign matter from entering the bearings, a seal is disposed between the spacer and the hub shell laterally outwardly of the bearing. In a more specific embodiment, a lock spacer is disposed over an outer periphery of the hub axle and is positioned between the hub axle and the hub shell. In this case the seal is disposed between the lock spacer and the hub shell laterally outwardly of the bearing. If desired, the lock spacer may include a flange disposed within the hub shell so that the seal is disposed between the flange and the bearing. The seal may include a first tongue for contacting a hub shell member and a second tongue for contacting the lock spacer. If the lock spacer includes an outer peripheral surface adjacent to the flange, then the second tongue may be disposed radially outwardly of the outer peripheral surface. The resulting structure forms a labyrinth seal which effectively prevents contaminants from reaching the bearings.

In another embodiment of the present invention, at least one of the inner ring and the outer ring is adjustable in an axial direction of the hub axle so that the bearings may be adjusted accordingly. For example, the inner ring may have a threaded surface that engages a threaded surface of the spacer so that the inner ring may be adjusted or removed from the spacer.

DETAILED DESCRIPTION OF THE EMBODIMENTS

Figure 1:
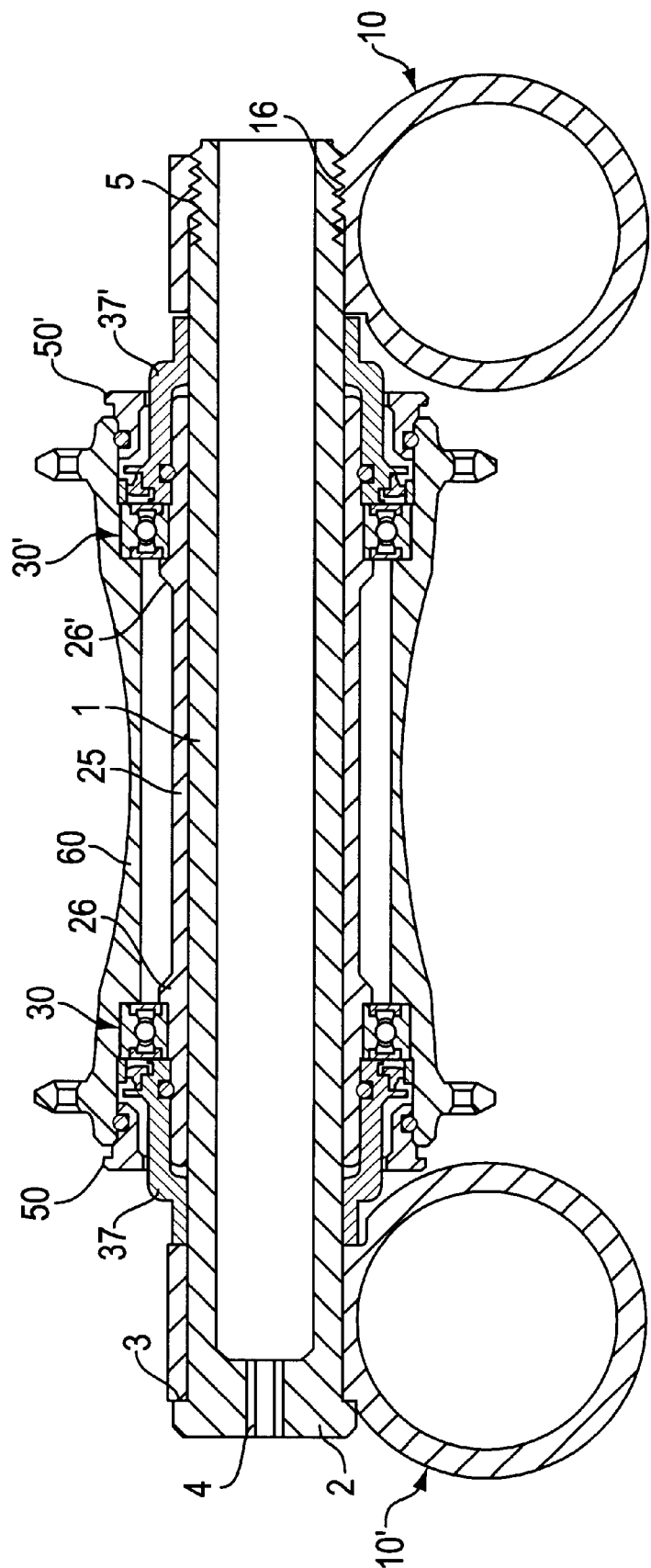
FIG. 1 is a top cross sectional view of a bicycle hub assembly according to the present invention.
Figure 2:
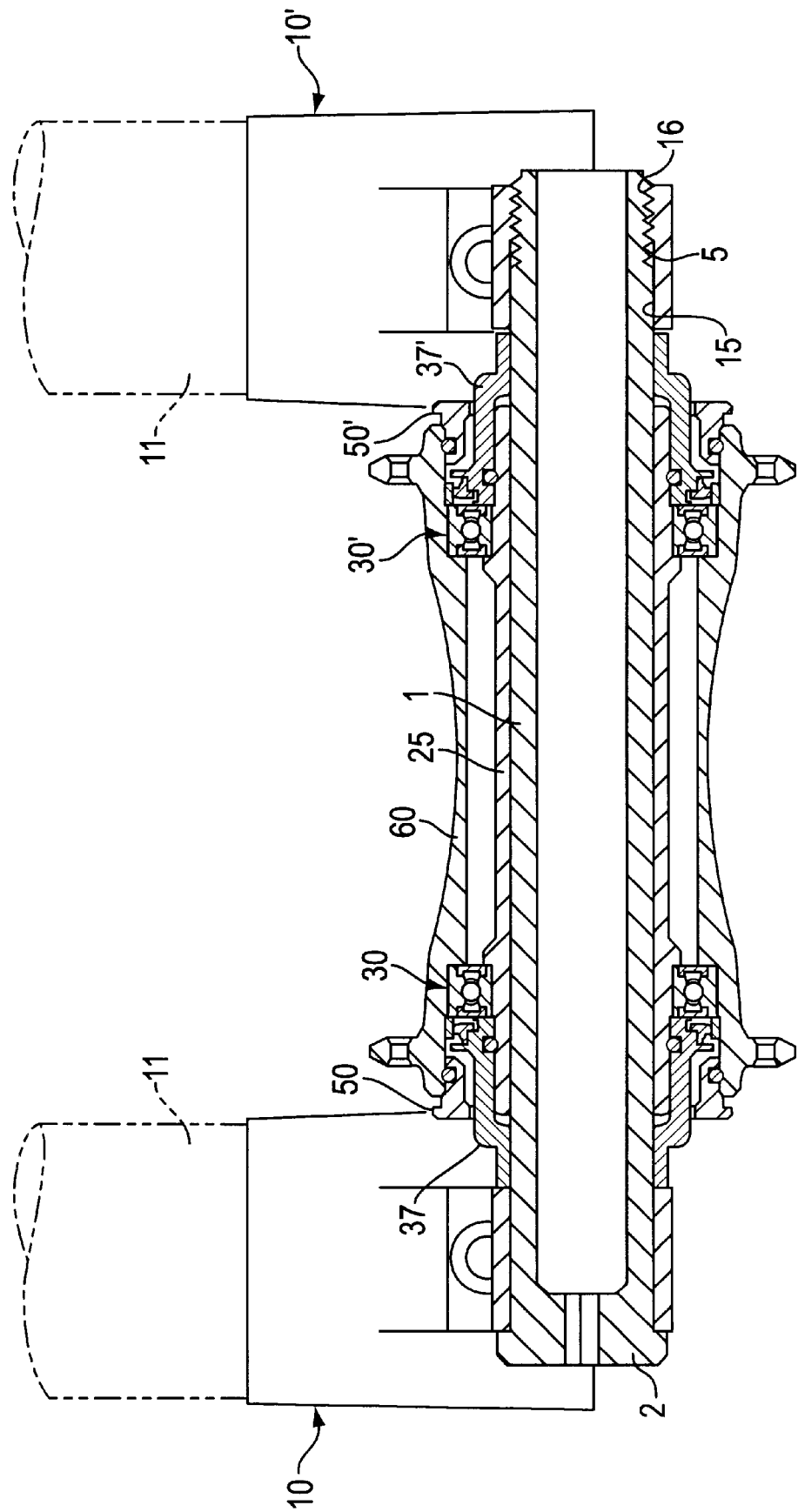
FIG. 2 is a front cross sectional view of the bicycle hub assembly shown in FIG. 1.
Figure 3:
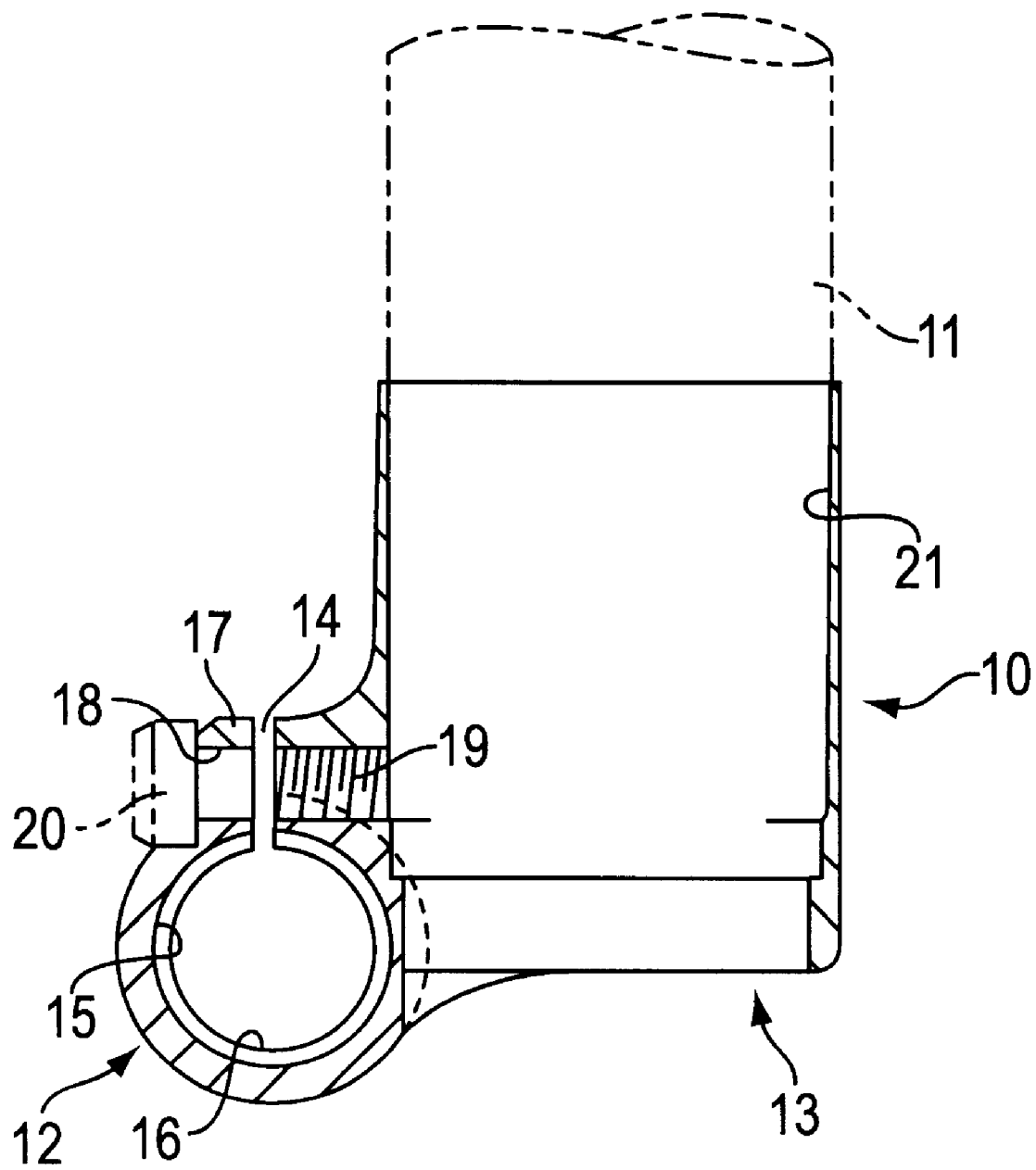
FIG. 3 is a side cross sectional view of the hub axle support bracket shown in FIG. 1.

As shown in FIGS. 1–3, a hub axle 1 has a hollow interior and a cylindrical shape. A head member 2 is formed on the surface of one end of the hub axle 1, and a side surface 3 that contacts a hub axle-support bracket 10 is formed on the outer periphery of the head member 2. The side surface 3 stops pressure in the direction of thrust via the hub axle support bracket 10. A wrench hole 4 which extends in the direction of the center line of the hub axle 1 is formed in the center of the head member 2. In this embodiment, the cross sectional shape of wrench hole 4 is a hexagon for the purpose of receiving a hexagonal wrench that turns the hub axle 1. A male thread 5 is formed on the outer periphery at the other end of the hub axle The two ends of the hub axle 1 are held in place with hub axle support brackets 10 and 10'. The hub axle support bracket 10 is linked and fastened to the lower end of a front fork 11 and, therefore, can be called a coupling for fastening the hub axle 1 to a bicycle frame. As shown in FIG. 3, the hub axle support bracket 10 comprises a hub fastener 12 and a fork fastener 13. A slit 14 is formed in the hub axle-fastener 12 such that the slit imparts a splitband shape to hub axle fastener 12. A female thread 16 is formed on an inner hole in the hub fastener 12, but there is not a female thread 16 on the other hub axle support bracket 10'.

A bolt insertion hole 18 is formed on the free end 17 of the hub axle fastener 12, and a screw hole 19 coaxial with the bolt insertion hole 18 is formed with the slit 14 in between. The hub axle fastener 12 is deformed by screwing a fixing bolt 20 into the screw hole 19 so that the free end 17 narrows the width of the slit 14 and firmly fastens the hub axle 1 to the hub axle fastener 12.

A front fork fastener hole 21 for inserting the lower end of the front fork 11 is formed in the front fork fastener 13. The purpose of the front fork fastener hole 21 is to serve as a member for insertion and fixing of the lower end of the front fork 11. This fastening action is achieved by applying an adhesive followed by press fitting. Shock absorbers (not illustrated) are provided at the upper ends of the front fork 11. Shock absorbers will not be described in detail as they are not the gist of the present invention. The other hub axle support bracket 10' is symmetrical to the hub axle support bracket 10 and its configuration is identical with the exception of the female thread 16. Thus, a description of bracket 10' is omitted.

Figure 4:
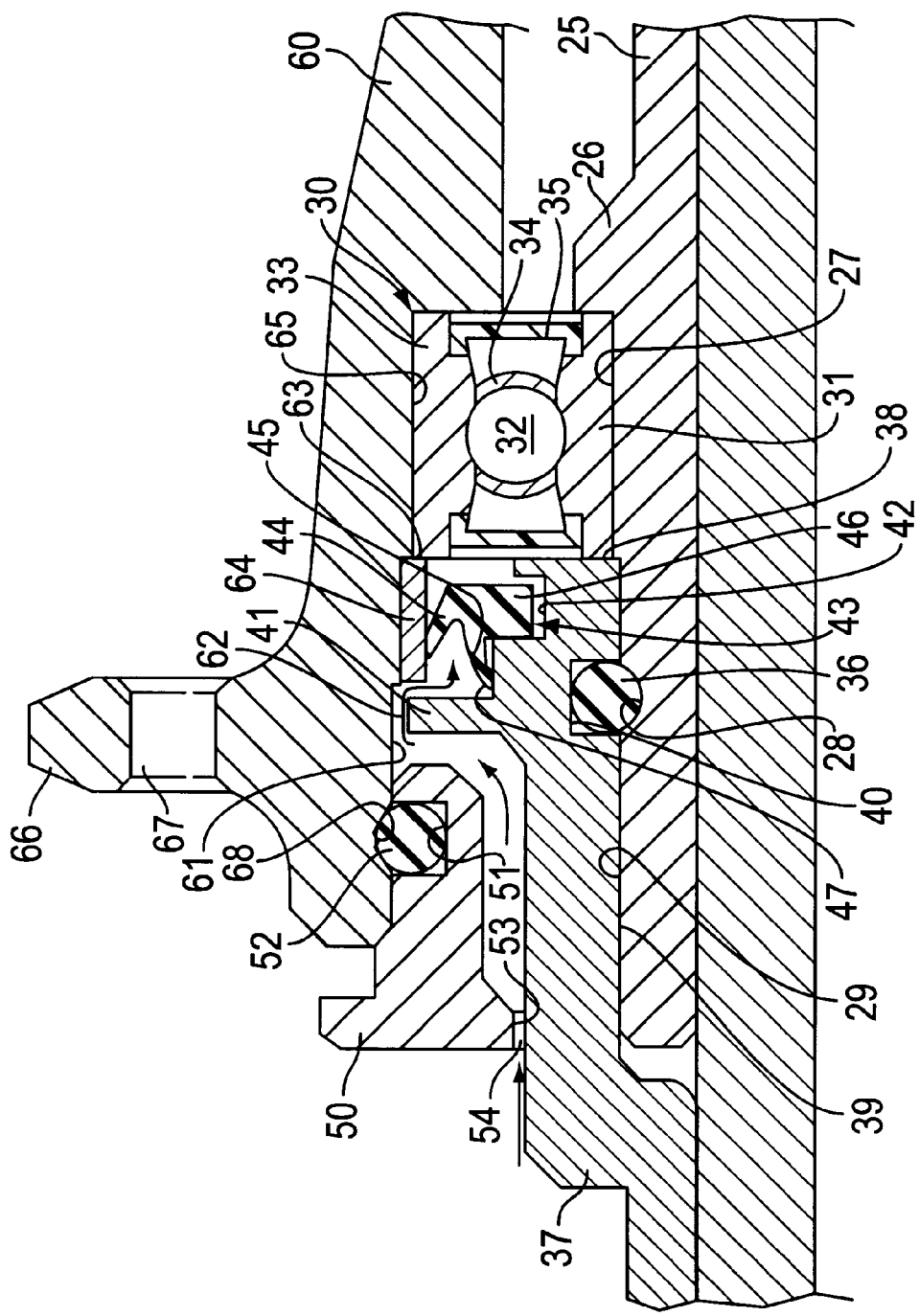
FIG. 4 is a detailed cross sectional view of the sealing apparatus shown in FIG. 1.

The configuration of a seal for preventing foreign matter from entering the bearing 30, which rotatably supports the hub shell 60 on the hub axle 1, will be described below with reference to FIG. 4. Furthermore, the description will be limited to only one of the bearings since the configuration of the front wheel hub is symmetrical. As shown in FIG. 4, a cylindrical spacer 25 is disposed on the outer periphery of the hub axle 1. Flanges 26 are formed on both ends of the outer periphery of the spacer 25 for retaining an inner ring 31 of the bearing 30. The inner ring 31 of the bearing 30 is press fit around the outer periphery 27 outside the flange 26. An O-ring groove 28 having a semicircular arc shape viewed cross sectionally is formed on both ends of the spacer 25.

A lock spacer 37 is provided at a position on an outer periphery 29 at each end of the spacer 25. One end surface 38 of the lock spacer 37 contacts the side surface of the inner ring 31. A concave groove 40 is formed on an inner peripheral surface 39 of the lock spacer 37. When assembled, an O-ring 36 is first inserted and positioned in the concave groove 40, and then the inner surface 39 of the lock spacer 37 is pushed around the outer periphery 29 of the spacer 25 until O-ring 36 locks into O-ring groove 28.

A flange 41 is formed on the outer periphery at one end of the lock spacer 37. A narrow gap 62 is formed between the flange 41 and an inner peripheral surface of a hub shell 60, therefore constricting the air passageways and forming a kind of labyrinth. A concave seal-groove 42 is formed on the outer periphery near one end surface 38 of the lock spacer 37. A rectangular section 46 of an oil seal 43 is inserted into the concave seal-groove-42 in a manner that leaves a slight space between them. The rectangular section 46 of the oil seal 43 and the concave seal-groove 42 forms a further labyrinth seal.

A ring 64 is inserted firmly within an inner peripheral surface 63 of the hub shell 60, and the outer peripheral surface of a first tongue member 44 of oil seal 43 is held firmly in contact with the inner peripheral surface of ring 64. Ring 64 is not always necessary and is a member that is provided for adjusting dimensions. Thus, it is permissible to bring the outer peripheral surface of the first tongue member 44 directly into contact with the inner hole 63 of the hub shell 60. As the hub shell 60 begins to rotate when the bicycle is traveling, the first tongue member 44 of the oil seal 43 is in contact with the inner peripheral surface of the ring 64, so the oil seal 43 rotates as well.

A second tongue member 45 of the oil seal 43 lightly contacts an outer peripheral surface 47 of the lock spacer 37. Therefore, the outer peripheral surface 47 of the lock spacer 37 is exposed to wear by the second tongue member 45 which contacts the peripheral surface 47 of the lock spacer 37. In this example, only the lock spacer 37 is fabricated from a titanium alloy, a relatively hard material, whereas the other members are fabricated from aluminum An outer ring 33 of the bearing 30 is press fit and fastened into an inner hole 65 of the hub shell 60. Steel balls 32 which are rolling members are positioned between the inner ring 31 and an outer ring 33, and the steel balls 32 roll on the race-groove surface. The steel balls 32 are positioned with equidistant spaces between balls and held in place by a retainer 34. Both end surfaces of the retainer 34 are covered with bearing covers 35 so that foreign matter does not enter. The design and function of the bearing 30 is well known.

Flanges 66 are formed on both ends of the hub shell 60, and spoke holes 67 are formed at equal angles along the outer periphery of the flanges 66. One end of a bicycle spoke is inserted and fastened in each spoke hole 67. An annular cap 50 is inserted and fastened within an inner surface of the hub shell 60 for filling the space between the hub shell 60 and the lock spacer 37, thus preventing foreign matter from entering the bearing 30.

A concave groove 51 is formed in the outer periphery of the cap 50 for insertion of an O-ring 52, and a V-groove 68 is formed on the inner peripheral surface 61 of the hub shell 60. When the cap 50 is inserted along the inner peripheral surface 61 of the hub shell 60 after the O-ring 52 has been slid into place around the cap 50, the O-ring 52 deforms and then snaps into V-groove 68, thus fastening the cap 50 is to the hub shell 60. A gap 54 is formed between an inner surface 53 of the cap 50 and the outer peripheral surface of the lock spacer 37 when cap 50 is in a fastened position. The gap 54 is very narrow, so the probability for foreign matter to enter is very low.

The following steps are taken to remove the front wheel hub from the front fork 11. Initially, the fixing bolt 20 is loosened. A wrench is inserted into the wrench hole 4 of the hub axle 1 and turned, which causes the male thread 5 of the hub axle 1 to disengage from the female thread 16 of the hub axle support bracket 10. The hub axle 1 is then removed from the spacer 25. The wheel, which is formed as an integral unit with the front wheel hub, can also be removed from hub axle support brackets 10 and 10' because the hub shell 60, the spacer 25, the bearing 30, the lock spacer 37, and the cap 50 are fabricated as an integral unit.

In order to attach the front wheel hub to the hub axle support brackets 10 and 10', the steps above should be taken in reverse order. If a wrench is inserted into the wrench hole 4 of the hub axle 1 and turned, then the male thread 5 of the hub axle 1 will screw into the female thread 16 of the hub axle support bracket 10. The side surface 3 of the head member 2 of the hub axle 1 pushes the hub axle fastener 12, and the hub axle fastener 12 pushes the lock spacer 37. When so pushed, the lock spacer 37 pushes the inner ring 31 of the bearing 30 against the flange 26 of the spacer 25. Similarly, the hub axle support bracket 10' on the opposite side pushes together the lock spacer 37', the inner ring 31' of the bearing 30', and the flange 26' of the spacer 25, all on the opposite side, so that the front wheel hub is fastened to the hub axle support brackets 10 and 10'.

As noted above, the gap 54 between the inner surface 53 of the cap 50 and the outer peripheral surface of the lock spacer 37 is very narrow, so the probability of foreign matter entering is small. Should foreign matter enter, however, it is hindered from entering the narrow gap 62 between the inner hole 61 and the hub shell 60. As the hub shell 60 starts to rotate when the bicycle is traveling, the first tongue member 44 of the oil seal 43 comes into contact with the inner peripheral surface of the ring 64, thus also rotating the oil seal 43. The first tongue member 44 expands outward radially due to the centrifugal force produced by the rotation of the oil seal 43, which further increases the sealing effect between said tongue member and the inner peripheral surface of the ring 64. The second tongue member 45 expands outwardly radially due to centrifugal force and separates from the outer peripheral surface 47 of the lock spacer 37, or the contact area is weakened. This compromises the sealing effect somewhat, but the rectangular section 46 of the oil seal 43 has been inserted into the concave groove 42, thus imparting a sealing effect due to the labyrinth, which effectively prevents foreign matter from entering.

Figure 5:
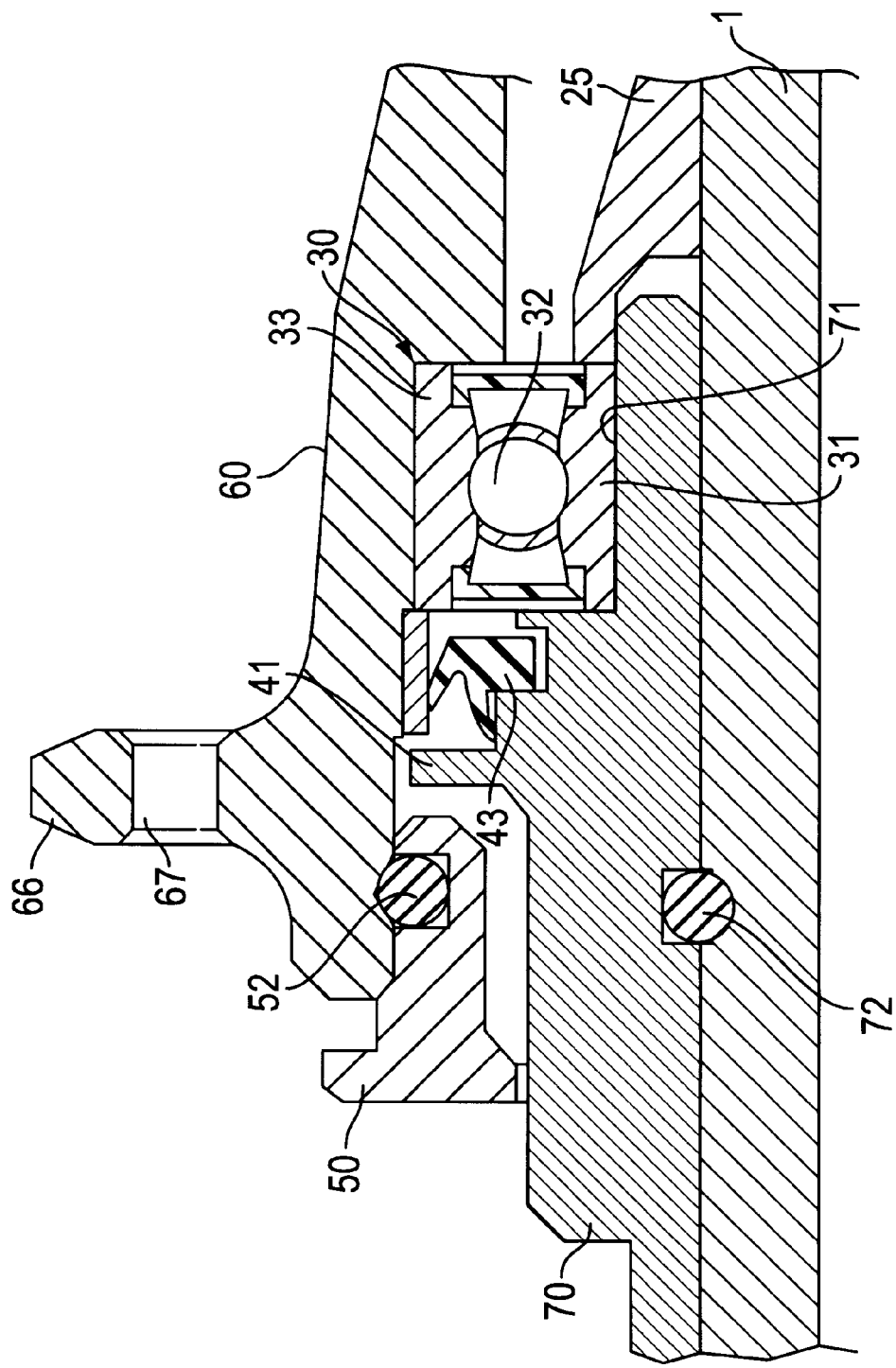
FIG. 5 is a detailed cross sectional view of an alternative embodiment of the sealing apparatus shown in FIG. 1.

FIG. 5 is a detailed cross sectional view of an alternative embodiment of the sealing apparatus shown in FIG. 1. In this embodiment, the inner ring 31 of the bearing 30 is fitted around the outer periphery 71 of a lock spacer 70. An O-ring 72 is positioned between the lock spacer 70 and the outer peripheral surface of the hub axle 1. As can be seen from this embodiment, the advantages of the present invention can be achieved even without inserting the inner ring 31 of the bearing 30 into the spacer 25.

Figure 6:
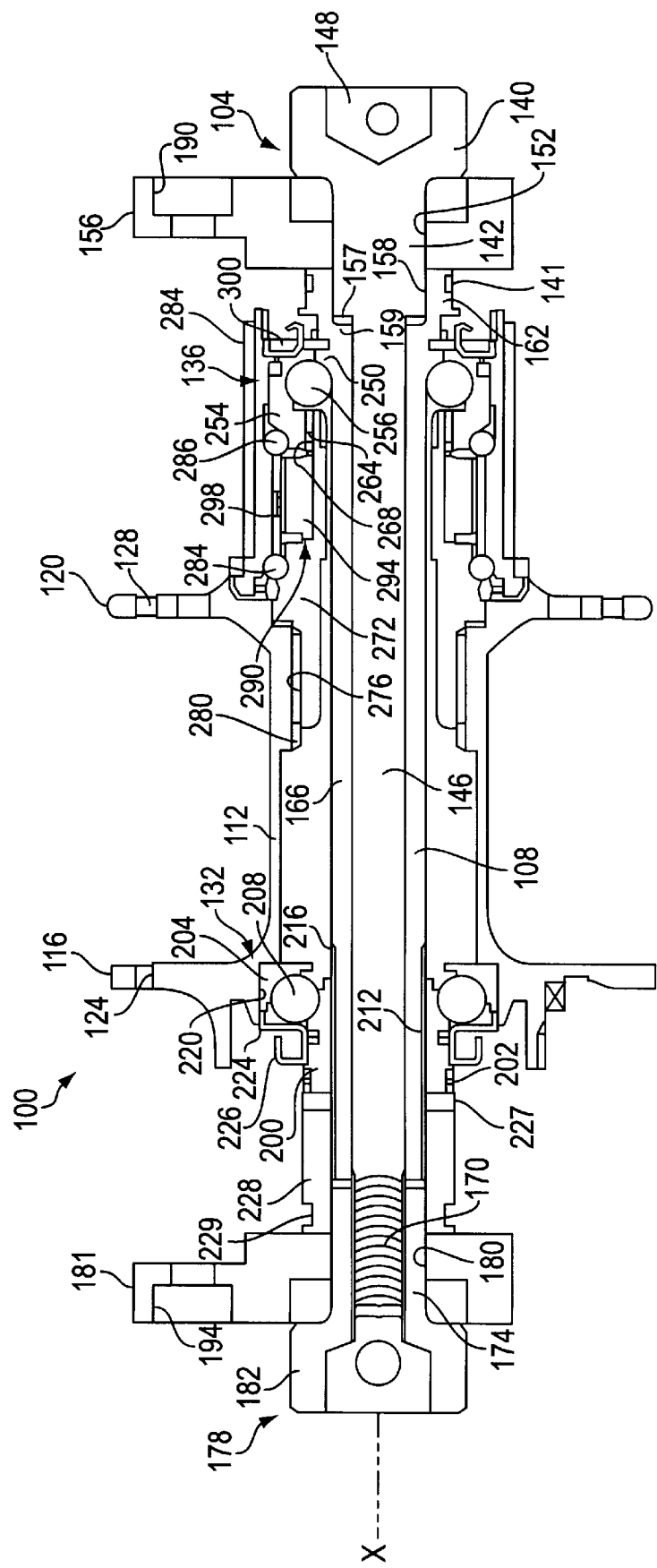
FIG. 6 is a cross sectional view of an alternative embodiment of a bicycle hub assembly according to the present invention.

FIG. 6 is a cross sectional view of an alternative embodiment of a bicycle hub 100 according to the present invention. Hub 100 may be used as a rear hub for the bicycle. Hub 100 includes a hub axle 104, a spacer 108 disposed over an outer periphery of hub axle 104, and a hub shell 112 having spoke connecting flanges 116 and 120 with conventional spoke receiving holes 124 and 128, respectively. Hub shell 112 is rotatably supported around hub axle 104 by bearing assemblies 132 and 136.

Hub axle 104 includes a large diameter portion 140, an intermediate diameter portion 142, and a small diameter portion 146. Large diameter portion 140 includes a hexagonal bore 148 for receiving an end of a hexagonal wrench (not shown). Intermediate diameter portion 142 of axle 104 is fitted within an opening 152 formed in a support bracket 156 and within an opening 158 formed in a large diameter portion 162 of spacer 108. An abutment 157 formed by intermediate diameter portion 142 of hub axle 104 is spaced apart from an abutment 159 formed by the large diameter portion 162 of spacer 108 to facilitate adjustment of the components. Small diameter portion 146 of axle 104 is slidably fitted within the main body 166 of spacer 108, and an end surface 170 of small diameter portion 146 of axle 104 threadingly engages the inside of a small diameter portion 174 of a hub nut 178. Small diameter portion 174 of hub nut 178 is fitted within an opening 180 of a support bracket 181 and is spaced apart from a lateral edge of spacer 108 to facilitate adjustment of the components. Hub nut 178 also includes a large diameter portion 182 with a hexagonal bore 186 for receiving an end of a hexagonal wrench (not shown). Support brackets 156 and 181 include openings 190 and 194 used to mount support brackets 156 and 181 to respective ends of a rear fork (not shown).

Bearing assembly 132 comprises an inner ring 200, an outer ring 204, and a plurality of rollers 208 in the form of ball bearings disposed between inner ring 200 and outer ring 204. Inner ring 200 functions as a bearing cone and includes a threaded inner surface 212 which threadingly engages a threaded outer peripheral surface 216 of spacer 108 so that inner ring 200 may be adjusted in the direction of the axis X of hub axle 104. Wrench flats 202 may be formed on the outer peripheral surface of inner ring 200 to facilitate adjustment or removal of inner ring 200. Similar wrench flats 141 may be formed on the large diameter portion 162 of spacer 108 for the same purpose. Outer ring 204 functions as a bearing cup, and it is fitted within an inner peripheral opening 220 of hub shell 112. A protective cap 224 is fitted between inner ring 200 and hub shell 112 for preventing water, dirt, etc. from contaminating bearing assembly 132. A further protective cap 226 is fitted around inner ring 200 for further protection against contamination. A lock nut 228 having wrench flats 229 threadingly engages the threaded outer peripheral surface 216 of spacer 108 to ensure that inner ring 200 does not become loose unintentionally. In this embodiment, a washer 227 is disposed between lock nut 228 and inner ring 200, but washer 227 may be omitted depending upon the hub shell used.

Bearing assembly 136 comprises an inner ring 250, an outer ring 254, and a plurality of rollers 256 in the form of ball bearings disposed between inner ring 250 and outer ring 254. In this embodiment, inner ring 250 is formed as one piece with spacer 108 and functions as a bearing cone. Outer ring 254 functions as a bearing cup, and it includes a threaded inner peripheral surface 264 that meshes with a threaded outer peripheral end surface 268 of an inner support member 272. Inner support member 272 also includes a splined outer peripheral surface 276 that meshes with a splined inner surface 280 of hub shell 112.

A sprocket support member 284 for supporting a plurality of drive sprockets (not shown) in a conventional manner is rotatably supported on inner support member 272 and outer ring 254 through a plurality of rollers 284 and 286, respectively, in the form of ball bearings. A one-way transmission mechanism 290 is disposed between sprocket support member 284 and inner support member 272 for transmitting rotational force from the drive sprockets to inner support member 272 (and therefore hub shell 112) in one direction only. One-way transmission mechanism 290 comprises a plurality of pawls 294 pivotably mounted around the outer peripheral surface of inner support member 272 for engaging a plurality of ratchet teeth 298 formed on the inner peripheral surface of sprocket support member 284. A pawl spring (not shown) biases the plurality of pawls 294 toward engagement with the plurality of ratchet teeth 298 in a well known manner. A seal ring 300 is fitted between spacer 108 and sprocket support member 284 for protecting bearing assembly 136 and the other components against water, dirt, etc.

By placing the right side bearing assembly 136 between spacer 108 and inner support member 272, instead of between spacer 108 and hub shell 112, bearing assemblies 132 and 136 can be spaced further apart from each other than in prior art hubs. Thus, in turn, distributes the drive load more evenly. Also, the adjustable nature of the inner ring 200 allows the bearing assemblies 132 and 136 to be periodically lubricated and adjusted in case of wear.

While the above is a description of various embodiments of the present invention, further modifications may be employed without departing from the spirit and scope of the present invention. For example, the hub axle 1 of the embodiments described above is fastened to the hub axle support bracket 10 by means of threads. However, the manner used for fastening the hub axle 1 is not limited to such a structure, and generally known fastening mechanisms such as nuts and quick-release mechanisms can be utilized as well. Furthermore, although the wrench holes in the above embodiments was hexagonal in shape, a square hole, a hexagonal bolt head, and other such forms can be utilized.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle hub comprising:
   a hub axle (1,104);
   a separate spacer (25,70,108) disposed over an outer periphery of the hub axle (1,104);
   wherein the hub axle (1,104) is detachably retained to the spacer (25.70,108):
   a hub shell (60,112); and
   a bearing (30,132,136) disposed between the spacer (25, 70,108) and the hub shell (60,112) for rotatably supporting the hub shell (60,112) on the hub axle (1,104), the bearing (30,132,136) including:
      an inner ring (31,200,250);
      an outer ring (33,204,254); and
      a plurality of rolling members (32,208,256) disposed between the inner ring (31, 200,250) and the outer ring (33,204,254).

2. The hub according to claim 1 wherein the inner ring (31,200) is fitted around an outer periphery (27,71,216) of the spacer (25,70,108), and the outer ring (33,204) is fitted around an inner periphery (65,220) of the hub shell (60).

3. The hub according to claim 1 further comprising a seal (43) disposed between the spacer (25,70) and the hub shell (60) laterally outwardly of the bearing (30).

4. The hub according to claim 1 wherein an end of the hub axle (1) forms a first threaded surface (5), and further comprising supporting means (13) for supporting the hub axle on a bicycle fork (11), the supporting means including a second threaded surface (16) for meshing with the first threaded surface (5).

5. The hub according to claim 1 wherein the spacer (25,70) comprises an axle spacer (25), wherein the inner ring (31) is disposed over an outer periphery (27) of the axle spacer (25), and further comprising a lock spacer (37) disposed over an outer periphery of the hub axle (1) laterally outwardly of the axle spacer (25) and positioned between the hub axle (1) and the hub shell (60).

6. A bicycle hub comprising:
   a hub axle (1);
   an axle spacer (25) disposed over an outer periphery of the hub axle (1);
   a hub shell (60);
   a bearing (30) disposed between the spacer (25) and the hub shell (60) for rotatable supporting the hub shell (60) on the hub axle (1), the bearing (30) including:
      an inner ring (31) disposed over an outer periphery (27) of the axle spacer (25);
      an outer ring (33); and
      a plurality of rolling members (32) disposed between the inner ring (31) and the outer ring (33);
   a lock spacer (37) disposed over an outer periphery of the hub axle (1) laterally outwardly of the axle spacer (25) and positioned between the hub axle (1) and the hub shell (60); and
   a seal (43) disposed between the lock spacer (37) and the hub shell (60) laterally outwardly of the bearing (30).

7. The hub according to claim 6 further comprising a dust cap (50) disposed between the lock spacer (37) and the hub shell (60) laterally outwardly of the seal (43).

8. The hub according to claim 6 wherein the axle spacer (25) includes a spacer flange (26) disposed laterally inwardly of the bearing (30), wherein the inner ring (31) abuts against the spacer flange (26), and wherein an end surface (38) of the lock spacer (37) abuts against the inner ring (31).

9. The hub according to claim 6 wherein the seal (43) comprises a first tongue (44) for contacting a hub shell member (64) and a second tongue (45) for contacting the lock spacer (37).

10. The hub according to claim 9 wherein the hub shell member (64) comprises a separate ring member (64) fitted to an inner peripheral surface (63) of the hub (60).

11. The hub according to claim 9 wherein the lock spacer (37) includes a seal groove (42), and wherein the seal (43) includes a section (46) fitted within the seal groove (42).

12. The hub according to claim 9 wherein the first tongue (44) extends laterally so that an end of the first tongue (44) moves radially outwardly when the hub shell (60) rotates.

13. The hub according to claim 6 wherein the lock spacer (37) includes a flange (41) disposed within the hub shell (60), and wherein the seal (43) is disposed between the flange (41) and the bearing (30).

14. The hub according to claim 13 wherein the seal (43) comprises a first tongue (44) for contacting a hub shell member (64) and a second tongue (45) for contacting the lock spacer (37).

15. The hub according to claim 14 wherein the lock spacer (37) includes an outer peripheral surface (47), and wherein the second tongue (45) is disposed radially outwardly of the outer peripheral surface (47).

16. The hub according to claim 15 wherein the first tongue (44) extends laterally so that an end of the first tongue (44) moves radially outwardly when the hub shell (60) is rotating.

17. The hub according to claim 16 wherein the axle spacer (25) includes a spacer flange (26) disposed laterally inwardly of the bearing (30), wherein the inner ring (31) abuts against the spacer flange (26), and wherein an end surface (38) of the lock spacer (37) abuts against the inner ring (31).

18. The hub according to claim 1 wherein the spacer (25,70) comprises a lock spacer (70), wherein the inner ring (31) is disposed over an outer periphery (71) of the lock spacer (70), and further comprising an axle spacer (25) disposed over an outer periphery of the hub axle (1) laterally inwardly of the lock spacer (70) and positioned between the hub axle (1) and the hub shell (60).

19. A bicycle hub comprising:
   a hub axle (1);
   a lock spacer (70) disposed over an outer periphery of the hub axle (1);
   a hub shell (60);
   a bearing (30) disposed between the lock spacer (70) and the hub shell (60) for rotatably supporting the hub shell (60) on the hub axle (1), the bearing (30) including:
      an inner ring (31) disposed over an outer periphery (71) of the lock spacer (70);
      an outer ring (33); and
      a plurality of rolling members (32) disposed between the inner ring (31) and the outer ring (33);
   an axle spacer (25) disposed over an outer periphery of the hub axle (1) laterally inwardly of the lock spacer (70) and positioned between the hub axle (1) and the hub shell (60); and
   a seal (43) disposed between the lock spacer (70) and the hub shell (60) laterally outwardly of the bearing (30).

20. The hub according to claim 19 further comprising a dust cap (50) disposed between the lock spacer (70) and the hub shell (60) laterally outwardly of the seal (43).

21. The hub according to claim 19 wherein the seal (43) comprises a first tongue (44) for contacting a hub shell member (64) and a second tongue (45) for contacting the spacer (70).

22. The hub according to claim 21 wherein the hub shell member (64) comprises a separate ring member (64) fitted to an inner peripheral surface (63) of the hub (60).

23. The hub according to claim 21 wherein the spacer (70) includes a seal groove (42), and wherein the seal (43) includes a section (46) fitted within the seal groove (42).

24. The hub according to claim 21 wherein the first tongue (44) extends laterally so that an end of the first tongue (44) moves radially outwardly when the hub shell (60) rotates.

25. The hub according to claim 19 wherein the lock spacer (70) includes a flange (41) disposed within the hub shell (60), and wherein the seal (43) is disposed between the flange (41) and the bearing (30).

26. The hub according to claim 25 wherein the seal (43) comprises a first tongue (44) for contacting a hub shell member (64) and a second tongue (45) for contacting the spacer (70).

27. The hub according to claim 26 wherein the lock spacer (70) includes an outer peripheral surface (47), and wherein the second tongue (45) is disposed radially outwardly of the outer peripheral surface (47).

28. The hub according to claim 27 wherein the first tongue (44) extends laterally so that an end of the first tongue (44) moves radially outwardly when the hub shell (60) rotates.

29. A bicycle hub comprising:
a hub axle (104);
a spacer (108) disposed over an outer periphery of the hub axle (1,104);
a hub shell (112);
a bearing (132,136) disposed between the spacer (108) and the hub shell (112) for rotatably supporting the hub shell (112) on the hub axle (104), the bearing (132,136) including:
an inner ring (200,250);
an outer ring (204,254); and
a plurality of rolling members (208,256) disposed between the inner ring (200,250) and the outer ring (204,254); and
wherein at least one of the inner ring (200) and the outer ring (204) is adjustable in an axial direction of the hub axle (104).

30. The hub according to claim 29 wherein the inner ring (200) has a threaded surface (212) that engages a threaded surface (216) of the spacer (108).

31. The hub according to claim 30 further comprising a lock nut (228) disposed laterally of the inner ring (200) and threadingly engaging the threaded surface (216) of the spacer (108).

32. A bicycle hub comprising:
a hub axle (104);
a spacer (108) disposed over an outer periphery of the hub axle (1,104);
a hub shell (112);
a bearing (132,136) disposed between the spacer (108) and the hub shell (112) for rotatable supporting the hub shell (112) on the hub axle (104), the bearing (132,136) including:
an inner ring (200,250);
an outer ring (204,254); and
a plurality of rolling members (208,256) disposed between the inner ring (200,250) and the outer ring (204,254); and
wherein the inner ring (250) is formed as one piece with the spacer (108).

33. A bicycle hub comprising:
a hub axle (104);
a spacer (108) disposed over an outer periphery of the hub axle (1,104);
a hub shell (112);
a bearing (132,136) disposed between the spacer (108) and the hub shell (112) for rotatably supporting the hub shell (112) on the hub axle (104), the bearing (132,136) including:
an inner ring (200,250);
an outer ring (204,254); and
a plurality of rolling members (208,256) disposed between the inner ring (200,250) and the outer ring (204,254);
an inner support member (272) coupled to the hub shell (112); and
a sprocket support member (284) rotatably supported around the inner support member (272);
wherein the outer ring (254) is coupled to the inner support member (272).

34. The hub according to claim 33 wherein the outer ring (254) is attached to an end of the inner support member (254).

35. The hub according to claim 34 wherein the inner ring (250) is formed as one piece with the spacer (108).

36. A bicycle hub comprising:
a hub axle (104);
a spacer (108) disposed over an outer periphery of the hub axle (1,104);
a hub shell (112);
a bearing (132,136) disposed between the spacer (108) and the hub shell (112) for rotatable supporting the hub shell (112) on the hub axle (104), the bearing (132.136) including:
an inner ring (200,250);
an outer ring (204,254); and
a plurality of rolling members (208,256) disposed between the inner ring (200,250) and the outer ring (204,254); and
a hub nut (178) disposed laterally of the spacer (108) and threadingly engaging a surface (170) of the hub axle (104).

37. A bicycle hub comprising:
a hub axle (104);
a spacer (108) disposed over an outer periphery of the hub axle (104);
a hub shell (112);
a first bearing (132) disposed between the spacer (108) and the hub shell (112) for rotatably supporting the hub shell (112) on the hub axle (104), the first bearing (132) including:
a first inner ring (200);
a first outer ring (204); and
a plurality of first rolling members (208) disposed between the first inner ring (200) and the first outer ring (204);
wherein at least one of the first inner ring (200) and the first outer ring (204) is adjustable in an axial direction of the hub axle (104); and
a second bearing (136) disposed between the spacer (108) and the hub shell (112) for rotatably supporting the hub shell (112) on the hub axle (104), the second bearing (136) including:

a second inner ring (250);

a second outer ring (254); and a plurality of second rolling members (256) disposed between the second inner ring (250) and the second outer ring (254).

38. The hub according to claim 37 wherein the first inner ring (200) is adjustable in an axial direction of the hub axle (104).

39. The hub according to claim 38 further comprising:

an inner support member (272) coupled to the hub shell (112); and a sprocket support member (284) rotatably supported around the inner support member (272);

wherein the second outer ring (254) is coupled to the inner support member (272).

40. The hub according to claim 39 wherein the first inner ring (200) has a threaded surface (212) that engages a threaded surface (216) of the spacer (108).

41. The hub according to claim 40 further comprising a hub nut (178) disposed laterally of the spacer (108) and threadingly engaging a surface (170) of the hub axle (104).

42. The hub according to claim 41 further comprising a lock nut (228) disposed laterally of the first inner ring (200) and threadingly engaging the threaded surface (216) of the spacer (108).

43. The hub according to claim 42 wherein the second inner ring (250) is formed as one piece with the spacer (108).

44. A bicycle hub comprising:

a hub shell (60,112) defining a central opening;

a flange (66,116,120) projecting radially outwardly from an outer peripheral surface of the hub shell (60,112) on each end of the hub shell (60,112), wherein each flange (66,116,120) includes a plurality of spoke holes (67, 124,128) disposed circumferentially around the flange (66);

a separate spacer (25,70,108) disposed in the central opening, wherein the spacer (25,70,108) is adapted to detachably fit over an outer periphery of a separate hub axle (1,104); and a bearing (30,132,136) disposed between the spacer (25, 70,108) and the hub shell (60,112) for rotatably supporting the hub shell (60,112) on the hub axle (1,104), the bearing (30,132,136) including:

an inner ring (31,200,250);

an outer ring (33,204,254); and a plurality of rolling members (32,208,256) disposed between the inner ring (31,200,250) and the outer ring (33,204,254).

45. The bicycle hub according to claim 44 further comprising:

an annular end cap (50) disposed at each free end of the hub shell (60) for covering an annular space defined by the hub shell (60) and the spacer (25,70).

46. The bicycle hub according to claim 44 wherein the spacer (25,108) comprises an elongated tube.

* * * * *